US 8,223,145 B2

(12) United States Patent
Chakraborty (10) Patent No.: US 8,223,145 B2
(45) Date of Patent: Jul. 17, 2012

(54) METHOD AND SYSTEM FOR 3D OBJECT POSITIONING IN 3D VIRTUAL ENVIRONMENTS

(75) Inventor: Tathagata Chakraborty, Mumbai (IN)

(73) Assignee: Geometric Ltd., Mumbai (IN)

( * ) Notice: Subject to any disclaimer, the term of this patent is extended or adjusted under 35 U.S.C. 154(b) by 717 days.

(21) Appl. No.: 12/411,556

(22) Filed: Mar. 26, 2009

(65) Prior Publication Data

US 2010/0245352 A1    Sep. 30, 2010

(51) Int. Cl.
*G06T 15/00* (2011.01)
(52) U.S. Cl. .................. 345/419; 345/421; 345/427
(58) Field of Classification Search ............ 345/421
See application file for complete search history.

(56) References Cited

U.S. PATENT DOCUMENTS

| 5,513,303 | A | 4/1996 | Robertson et al. |
| 5,734,805 | A | 3/1998 | Isensee et al. |
| 6,323,859 | B1 | 11/2001 | Gantt |
| 6,556,206 | B1 * | 4/2003 | Benson et al. ............ 345/473 |
| 2009/0058806 | A1 * | 3/2009 | Middler et al. ............ 345/157 |

OTHER PUBLICATIONS

Eric Allan Bier; Skitters and Jacks; 1987; ACM New York, NY; 13D '86 Proceedings of the 1986 workshop on Interactive 3D graphics; pp. 183-196.*
Teather, et al, "Guidelines for 3D Positioning Techniques," Nov. 2007, pp. 61-68, Proceedings of the 2007 Conference on Future Play, Toronto, Canada, ISBN:978-1-59593-943-2.
Burtnyk, et al., "StyleCam: Interactive Stylized 3D Navigation using Intergrated Spatial & Temporal Controls," Oct. 27-30, 2002, pp. 101-110, vol. 4, Issue 2, in Proceedings of Association for Computing Machinery, Inc. UIST, Paris, France.
Khan, et al., "ViewCube: A 3D Orientation Indicator and Controller," Feb. 15-17, 2008, pp. 17-25, in Proceedings of the 2008 Symposium on Interactive 3D Graphics and Games, Redwood City, California.
Fitzmaurice, et al., "Safe 3D Navigation," Feb. 15-17, 2008, pp. 7-15, in Proceedings of the 2008 Symposium on Interactive 3D Graphics and Games, Redwood City, California.
Bier, "Snap-Dragging: Interactive Geometric Design in Two and Three Dimensions," May 19, 1988, pp. 1-164, Technical Report No. UCB/CSD-88-416, University of California at Berkeley.
Bier, "Snap-Dragging in Three Dimensions," 1990, pp. 193-204, in Proceedings of the 1990 Symposium on Interactive 3D Graphics.

* cited by examiner

*Primary Examiner* — James A Thompson
*Assistant Examiner* — Peter Hoang
(74) *Attorney, Agent, or Firm* — Stites & Harbison PLLC; Jeffrey A. Haeberlin (57) ABSTRACT

A system for large scale spatial positioning of a 3D virtual object in a 3D virtual scene, includes a computing device. The computing device: displays a guide plane attached to the object, the guide plane passing through a center of the object and being translucent, the guide plane indicating lines and curves of intersection between the guide plane and other objects of the scene. When moving the object along an axis, the computing device determines a normal of the guide plane to be parallel to the axis and passing through the center of the object, and moves the guide plane with the movement of the object. When moving the object across the movement plane, the computing device determines a normal of the guide plane to be parallel to a normal of the movement plane, and holds the guide plane static.

14 Claims, 6 Drawing Sheets

METHOD AND SYSTEM FOR 3D OBJECT POSITIONING IN 3D VIRTUAL ENVIRONMENTS

FIELD OF THE INVENTION

The present invention relates to a method and system of displaying three dimensional (3D) visual aids comprising a plurality of 3D guide planes and 3D lines, for large scale computer-implemented spatial positioning of a 3D virtual object in a 3D virtual environment.

BACKGROUND OF THE INVENTION

There has been a rapid increase in the number of consumer grade 3D software applications, especially targeted towards the domains of interactive media and 3D games. An increasingly large percentage of the digital media that we view or interact with today are now being created using these applications.

All consumer 3D software applications must support some form of camera navigation and tools for component or object positioning. Camera navigation essentially provides a means for viewing the scene from various angles and distance or detail. Real time camera navigation in the 3D scene has become an integral part of all 3D software applications.

Graphical tools for computer-implemented component or object (i.e., 3D virtual object) positioning are essential in 3D software applications that support some form of scene compositing. These tools allow the user to interactively place a 3D virtual object in a required location in a 3D virtual scene.

Until recently, few people used to interact with 3D virtual scenes large enough to require extensive component or object positioning operations. However, this scenario is changing rapidly with the increasing availability of large and complex 3D models and virtual scenes, and with the rise of various low end polygonal modelers and virtual scene compositing applications. Scene composition is rapidly becoming popular among a large section of artists, architects and designers.

Most 3D software applications use a familiar onscreen triad shaped object controller for approximate component or object positioning (i.e., manipulation of data representing a 3D virtual object to position the 3D virtual object within a 3D virtual scene). The various parts of this controller can be dragged to move the 3D virtual object along an axis or across a movement plane. Additionally the 3D virtual object can also be rotated by dragging parts of the object controller.

While small scale movement using the object controller can be achieved easily, large scale positioning of a 3D virtual object using the object controller alone is difficult. Large scale 3D virtual object movement requires the user to reorient the camera several times to accurately place the component in the scene. This is because the spatial relationship of the component with the rest of the scene is not immediately apparent from a single point of view.

There are no prior art systems for aiding large scale 3D virtual object movement in 3D virtual scenes ("3D virtual space"). However, there exists significant prior art in techniques for camera navigation. (See Nicholas Burtnyk, Azam Khan, George Fitzmaurice, Ravin Balakrishnan, Gordon Kurtenbach. StyleCam: Interactive Stylized 3D Navigation using Integrated Spatial & Temporal Controls. In Proceedings of ACM UIST 2002, pages 101-110, 2002.) These studies are all aimed towards providing a simplified 3D camera navigation model by constraining the camera using various techniques. (See Azam Khan, Igor Mordatch, George Fitzmaurice, Justin Matejka and Gordon Kurtenbach. ViewCube: a 3D Orientation Indicator and Controller. In Proceedings of the 2008 Symposium on Interactive 3D Graphics and Games, Feb. 15-17, 2008, Redwood City, Calif.) From a study of these references it is clear that camera navigation poses a significant problem in scene compositing. (See Azam Khan, Igor Mordatch, George Fitzmaurice, Justin Matejka and Gordon Kurtenbach. Safe 3D Navigation. In Proceedings of the 2008 Symposium on Interactive 3D Graphics and Games, pages 7-15, Feb. 15-17, 2008, Redwood City, Calif.)

There exists prior art in small scale 3D virtual object movement for purposes of alignment and object modeling. Here 3D virtual objects are snapped to grid lines for proper alignment. (See Eric A. Bier. Snap-Dragging in Three Dimensions. In Proceedings of the 1990 symposium on Interactive 3D graphics, pages 193-203, 1990). Such a system doesn't readily scale up for large scale 3D virtual object movement, because the density of the grid lines increases when viewed in perspective or when viewed at a low angle.

Guide planes, grids and lines are used in many 3D scene modeling applications to enable the user to model 3D virtual objects accurately and interactively. In most of these systems the user's cursor or the virtual manipulation pointer gets automatically snapped onto the grid or guide lines, when the cursor is a small distance away from the line or plane. This allows the user to model objects within the tolerance offered by the system of grids. This also allows the user to accurately align 3D virtual objects, by aligning each object to the same grid line or plane. However, as mentioned earlier these techniques cannot be scaled for large scale 3D virtual object positioning.

In summary, while there exists significant prior art in aids for camera navigation and small scale 3D virtual object alignment and movement, there are no prior art in aids for large scale 3D virtual object positioning. Large scale 3D virtual object positioning is required in 3D virtual scene compositing software applications, which are rapidly becoming popular among artists and designers.

SUMMARY OF THE INVENTION

In accordance with an aspect of the invention, a system for large scale spatial positioning of a three-dimensional (3D) virtual object in a 3D virtual scene, includes: a display device, an input device and a computing device. The display device displays the 3D virtual object in the 3D virtual scene. The input device receives input from a user. The computing device is in communication with the display device and the input device.

The computing device implements the steps of a method for large scale spatial positioning of a three-dimensional (3D) virtual object in a 3D virtual scene, including: attaching an object controller to the 3D virtual object, the object controller moving the 3D virtual object in the 3D virtual scene along an axis or across a movement plane in response to user input from the input device; and displaying on the display device a guide plane attached to the 3D virtual object, the guide plane passing through a center of the 3D virtual object and being translucent, the guide plane indicating lines and curves of intersection between the guide plane and other objects of the 3D virtual scene which intersect with the guide plane, such that the guide plane demarcates portions of the 3D virtual object and the 3D virtual scene on either side of the guide plane. When moving the 3D virtual object along the axis, the computing device further determines a normal of the guide plane to be parallel to the axis and passing through the center of the 3D virtual object, and moves the guide plane with the movement of the 3D virtual object. When moving the 3D object across the movement plane, the computing device still further determines a normal of the guide plane to be parallel to a normal of the movement plane, and holds the guide plane static.

In accordance with one implementation, the center of the 3D virtual object through which the guide plane passes is a center of a bounding box of the 3D virtual object.

In accordance with another implementation, the center of the 3D virtual object through which the guide plane passes is the origin of a local coordinate system of the 3D virtual object.

In accordance with yet another implementation, the lines and curves of intersection of the guide plane with the objects in the 3D virtual scene are displayed by the computing device on the display device.

In accordance with still another implementation, the computing device further attaches a plurality of guide lines to the object controller of the 3D virtual object indicating relative distance of the 3D virtual object from a center of the 3D virtual scene.

The center of the 3D virtual scene may be a center of a bounding box of the 3D virtual scene, or may be the origin of a local coordinate system of the 3D virtual scene.

The computing device may further display the magnitude of the distances represented by the guide lines along the guide lines. Under these circumstances, the magnitude of the distances represented by the guide lines may be displayed in one of numeric form and textual.

In accordance with another implementation, attaching a plurality of guide lines to the object controller of the 3D virtual object includes: displaying, on the display device, a guide line connecting a center of 3D virtual scene to the center of the 3D virtual scene projected onto the guide plane; and displaying, on the display device, a rectangle having one corner fixed to the center of the 3D virtual scene projected onto the guide plane, and a diagonal corner fixed to the center of the 3D object.

In accordance with a further implementation, there is provided a computer-based method that dynamically computes the location and parameters of the guide planes and guide lines, said method based preferably on the location of the object with respect to the scene or some scene object, the local coordinate system of the object and the global coordinate system of the scene under composition.

In yet another implementation, both the plurality of guide planes and guide lines may optionally have a set of snap lines and snap points respectively, where the object and the object controllers snap, when the object is within a certain tolerance of this line or point, during object transformation.

In accordance with yet another aspect of the invention, there is provided a physical computer-readable medium, such as a computer memory, hard disk, floppy disk, DVD-ROM, CD-ROM, or the like, having computer executable instructions stored thereon for causing a computer to display in a 3D virtual space the guide planes and guide lines attached to an object controller while the object is under transformation.

Further features and advantages of the present invention will be set forth in, or apparent from, the detailed description of preferred embodiments thereof which follows.

DETAIL DESCRIPTION OF EXEMPLARY EMBODIMENTS

Scene compositing is usually done after the creation of individual 3D virtual objects or in purely scene compositing applications. In accordance with one aspect of the invention, there is provided a method and system of visual aids comprising a plurality of translucent planes and guide lines, which enable the user to spatially position an object in a large scene, with a fair degree of accuracy during scene composition. The system of the invention provides the user with feedback on the relative spatial location in 3D of the component in real time during scene compositing.

As indicated above, the present invention addresses the problem of accurately positioning a 3D object in a large and complex 3D virtual environment or scene. Traditionally, the user is required to reorient the active camera several times and switch back and forth between component movement and camera navigation, to get an accurate idea of the location of the component in the scene during component positioning. In the system of the invention the feedback is instantaneous and the user is not required to reorient the camera under most circumstances.

It is of interest to artists and designers to have a simple and effective system of guide planes and lines attached to a 3d virtual object while the 3D virtual object is being positioned in 3D virtual space. These guide planes and lines can provide additional spatial information to the user thus enabling the user to position the 3D virtual object correctly. The guide planes and lines can help the user achieve large scale 3D virtual object movement effectively and accurately, without having to reorient the camera more than a couple of times in most cases. Advantageously, the guide planes and lines are designed so as not to overly obscure the 3D virtual scene or distract the user.

Guide planes, grids and lines are used in many 3D scene modeling applications to enable the user to model objects accurately and interactively. In most of these systems the user's cursor or the virtual manipulation pointer gets automatically snapped onto the grid or guide lines, when the cursor is a small distance away from the line or plane. This allows the user to model objects within the tolerance offered by the system of grids. This also allows the user to accurately align objects, by aligning each object to the same grid line or plane.

Advantageously, exemplary embodiments described herein include a similar set of guide planes and lines for use in large scale movement of 3D virtual objects, including 3D scene components, lights and cameras. These guide planes and lines are preferably attached to the 3D virtual object center.

Scene compositing is done after the creation of individual scene objects (3D virtual objects) or in purely scene compositing software applications running on a computer. The purpose of the guide planes and lines is to give the user a feedback on the relative location in 3D of the 3D virtual object in real time during scene compositing. Traditionally, the user is required to reorient the active camera several times and switch back and forth between component movement and camera navigation, to get an accurate idea of the location of the component in the scene during component movement. In the exemplary embodiments described herein, the feedback is instantaneous and the user is not required to reorient the camera under most circumstances. By design the feedback on the location of the object in the 3D scene must not be disruptive of the actual process of scene compositing.

Figure 1:
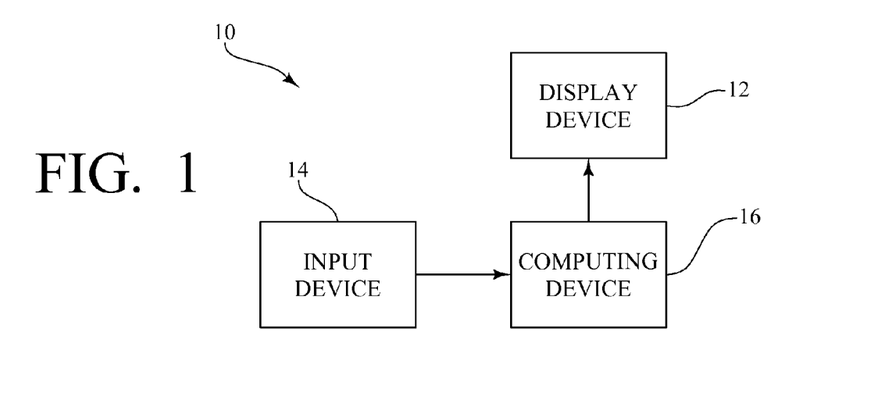
FIG. 1 is a block diagram of an exemplary system for large scale spatial positioning of a 3D virtual object in a 3D virtual scene according to the invention.

FIG. 1 shows an exemplary system 10 for large scale spatial positioning of a three-dimensional (3D) virtual object in a 3D virtual scene, including: a display device 12, an input device 14 and a computing device 16. The display device 12 displays the 3D virtual object in the 3D virtual scene. The input device 14 receives input from a user. The computing device 16 performs the steps described below with respect to FIG. 2.

Figure 2:
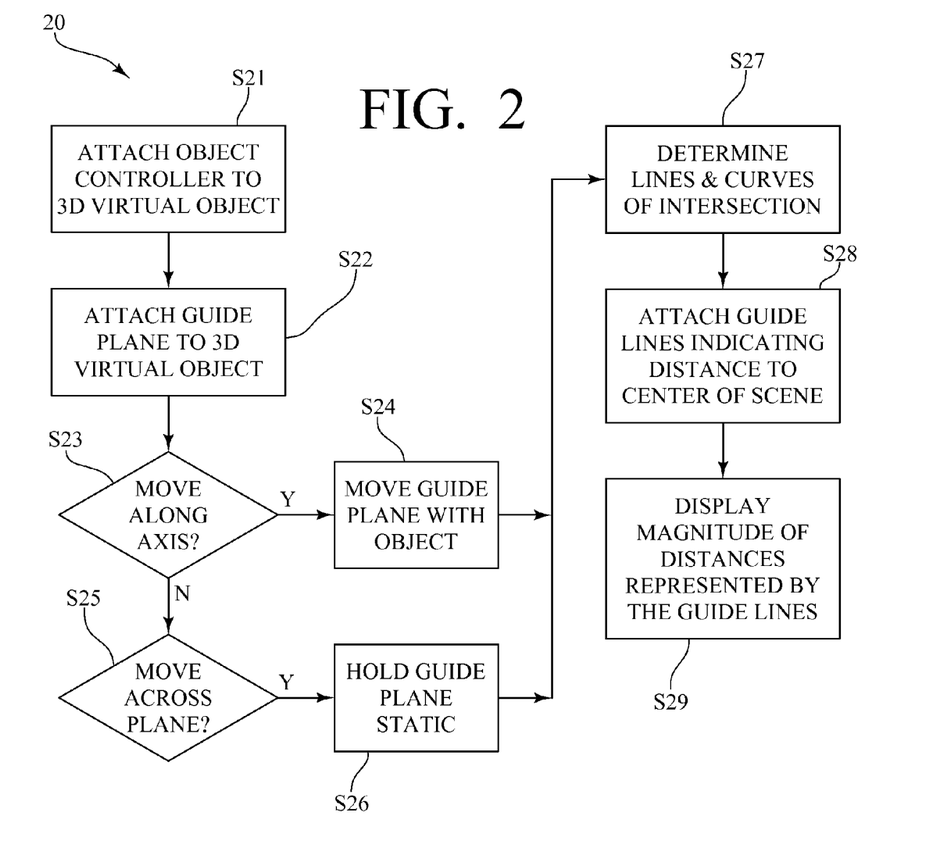
FIG. 2 is a flow chart of an exemplary computer-implemented method for large scale spatial positioning of a 3D virtual object in a 3D virtual scene according to the invention.

FIG. 2 is a flow chart, generally designated as 20, showing an exemplary method for large scale spatial positioning of a 3D virtual object in a 3D virtual scene, including: a step S22 of attaching an object controller to the 3D virtual object, the object controller moving the 3D virtual object in the 3D virtual scene along an axis (one of three axes of 3D space) of the or across a movement plane in response to user input from the input device 14 (FIG. 1); and a step S24 of displaying on the display device 12 (FIG. 1) a guide plane attached to the 3D virtual object, the guide plane passing through a center of the 3D virtual object and being translucent, the guide plane indicating lines and curves of intersection between the guide plane and other objects of the 3D virtual scene which intersect with the guide plane, such that the guide plane demarcates portions of the 3D virtual object and the 3D virtual scene on either side of the guide plane.

When moving the 3D virtual object along the axis, the computing device 16 (FIG. 1) further determines a normal of the guide plane to be parallel to the axis and passing through the center of the 3D virtual object, and moves the guide plane with the movement of the 3D virtual object. Thus, in the flow chart 20 (FIG. 2), a step S23 is determining if the 3D virtual object is being moved along an axis. If so, then step S24 is moving the guide plane with the movement of the virtual object.

When moving the 3D object across the movement plane, the computing device 16 (FIG. 1) further determines a normal of the guide plane to be parallel to a normal of the movement plane, and holds the guide plane static. Thus, in the flow chart 20 (FIG. 2), a step S25 is determining that the 3D virtual object is being moved across the movement plane, and a step S26 is holding the guide plane static.

Further, a step S27 is determining the lines and curves of intersection between the guide plane and other objects of the 3D virtual scene which intersect with the guide plane.

A step S28 is attaching a plurality of guide lines to the object controller of the 3D virtual object indicating relative distance of the 3D virtual object from a center of the 3D virtual scene.

A step S29 is displaying a magnitude of the distances represented by the guide lines along the guide lines.

One of skill in the art will immediately recognize that the exemplary system 10 is essentially a computer executing particular software to perform the exemplary method 20. The software is a product embodied in a computer readable storage medium (i.e., instructions fixed a tangible medium, such as RAM, a CD-ROM, a DVD-ROM, a flash drive, a hard disk or a floppy disk) either in the computing device 16 or otherwise in communication therewith. The software contains program instructions causing the computing device 16 to manipulate or otherwise transform data comprising the 3D virtual object and the 3d virtual scene, which represent a physical object and a physical scene, to perform the processes, methods and functions described herein.

Further, one of skill in the art will recognize that the exemplary system 10 and the exemplary method 20 are described herein in the context of 3D graphics systems and software applications.

Figure 3:
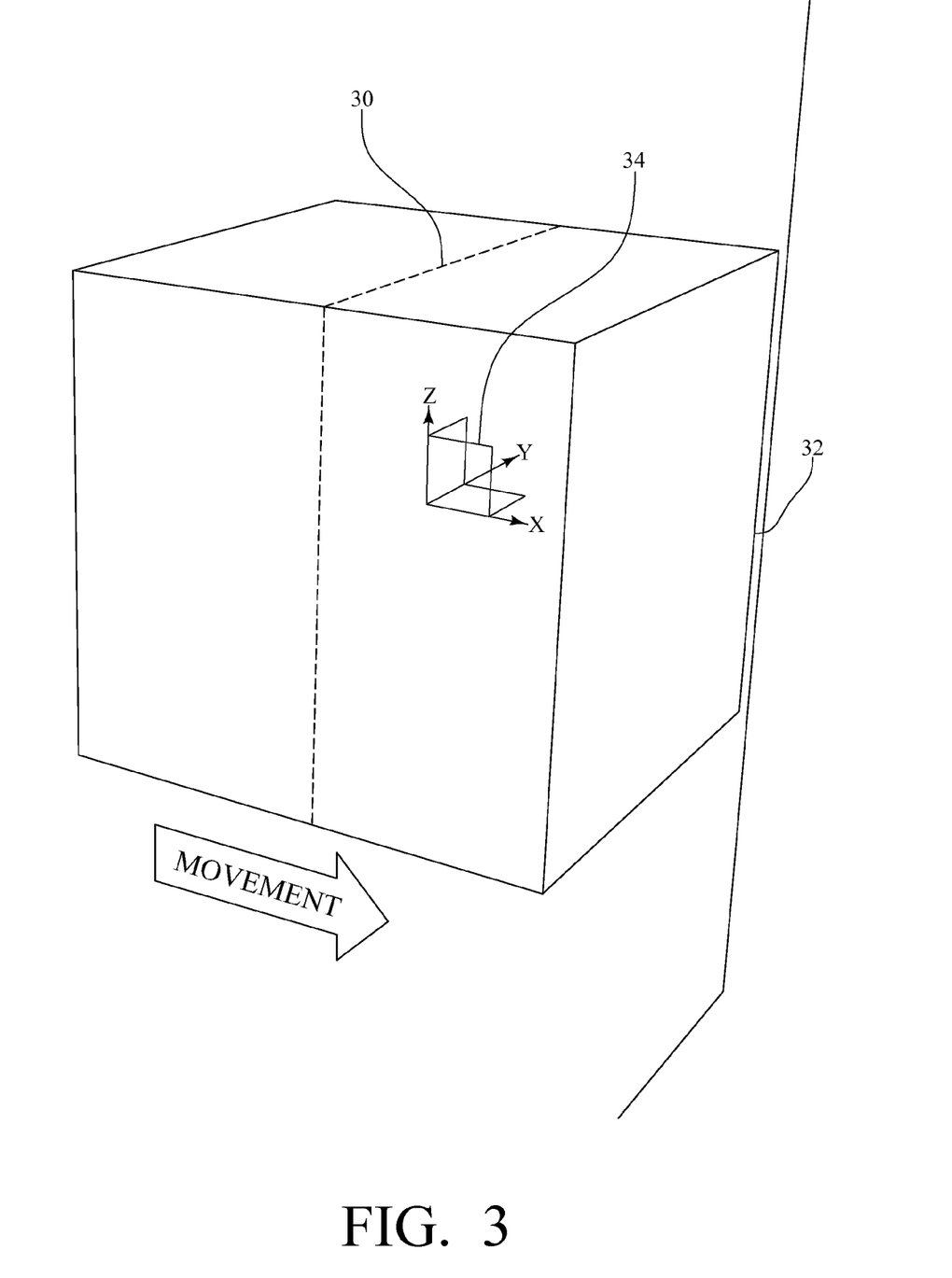
FIG. 3 is an exemplary display showing an exemplary guide plane in a 3D virtual scene consisting of a single 3D virtual object

FIG. 3 shows a guide plane 30 passing through a center of a 3D virtual object 32. The guide plane 30 is translucent. The center of the 3D virtual object 32 is either the spatial center of the 3D virtual object 32, the center of mass of the 3D virtual object 32, or an origin of a local coordinate system of the 3D virtual object 32 under transformation. As shown, the guide plane 30 passes through the center of the 3D virtual object 32, in this case a cube. The guide plane 30 demarcates portions of the 3D virtual object 32 and the 3D virtual scene on either side of the guide plane 30. Additionally, the translucency readily indicates the lines and curves of intersection between the guide plane 30 and any objects comprising the scene which intersect with the guide plane 30. Also shown is an object controller 34 used in moving the 3D virtual object 32 along an axis or across a movement plane.

Figure 4:
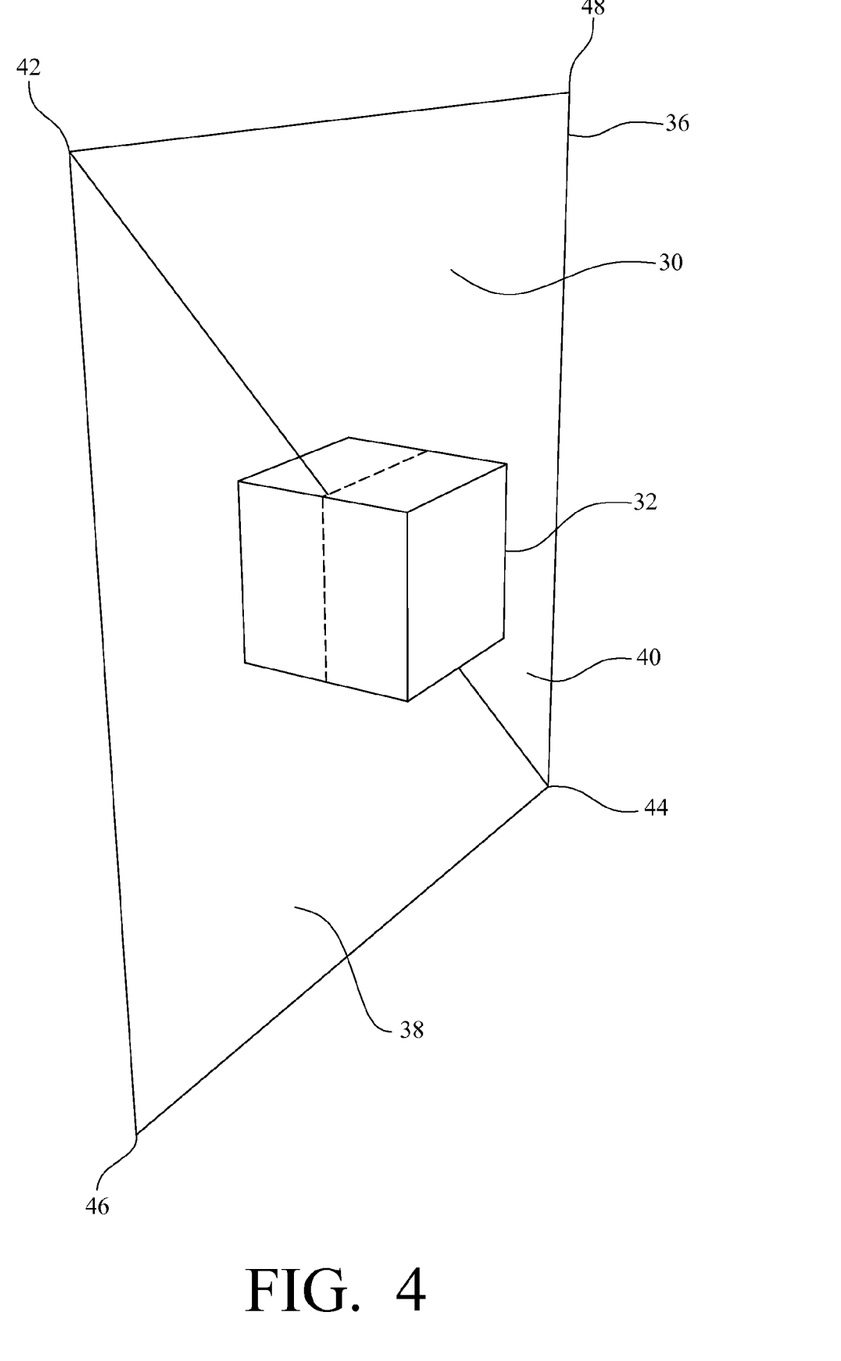
FIG. 4 is an exemplary display showing a guide plane constructed out of two triangle primitives.

FIG. 4 shows the guide plane 30 being constructed from a quadrilateral element 36 having a translucent fill or material. The quadrilateral element 36 can be represented on most graphics systems using a set of only two triangles primitives 38, 40. The two triangle primitives 38, 40, each comprising three vertices primitives 42, 44, 46 and 42, 44, 48, share amongst themselves two vertices primitives 42, 44. Therefore, in all only four vertices primitives 42, 44, 46, 48 are required to represent the guide plane 30. The guide plane 30 consisting of two triangle primitives 38, 40 or four vertices primitives 42, 44, 46, 48 and the associated fill or material can therefore be composed and rendered at runtime on most graphics systems without any observable performance hit.

Preferably, the guide plane 30 is large enough to encompass the visible portion of the 3D virtual scene. In practice, the guide plane 30 is constructed with sides measuring twice a radius of a bounding sphere of the 3D virtual scene, thereby ensuring that the scene is always covered. Additionally, the triangle primitives 38, 40 comprising the guide plane 30 are created or updated at runtime to reflect the current position of the 3D virtual object that is being transformed.

The guide plane 30 is displayed both when the 3D virtual object 32 is being transformed or moved along an axis, and also when the 3D virtual object 32 is being transformed or moved across a plane. Both types of movement are usually supported by most 3D software applications. When the 3D virtual object 32 is being transformed along an axis, a guide plane 30 is shown which has a normal parallel to the axis and passing through the center of the 3D virtual object 32. See for example FIG. 3, where the 3D virtual object 32 is being moved along the X axis and the guide plane 30 is displayed parallel to the YZ plane. Since the guide plane 30 always passes through the center of the 3D virtual object 32 being transformed or moved, the guide plane 30 also dynamically changes position with the 3D virtual component 32 when the 3D virtual component is transformed or moved along an axis.

Figure 5:
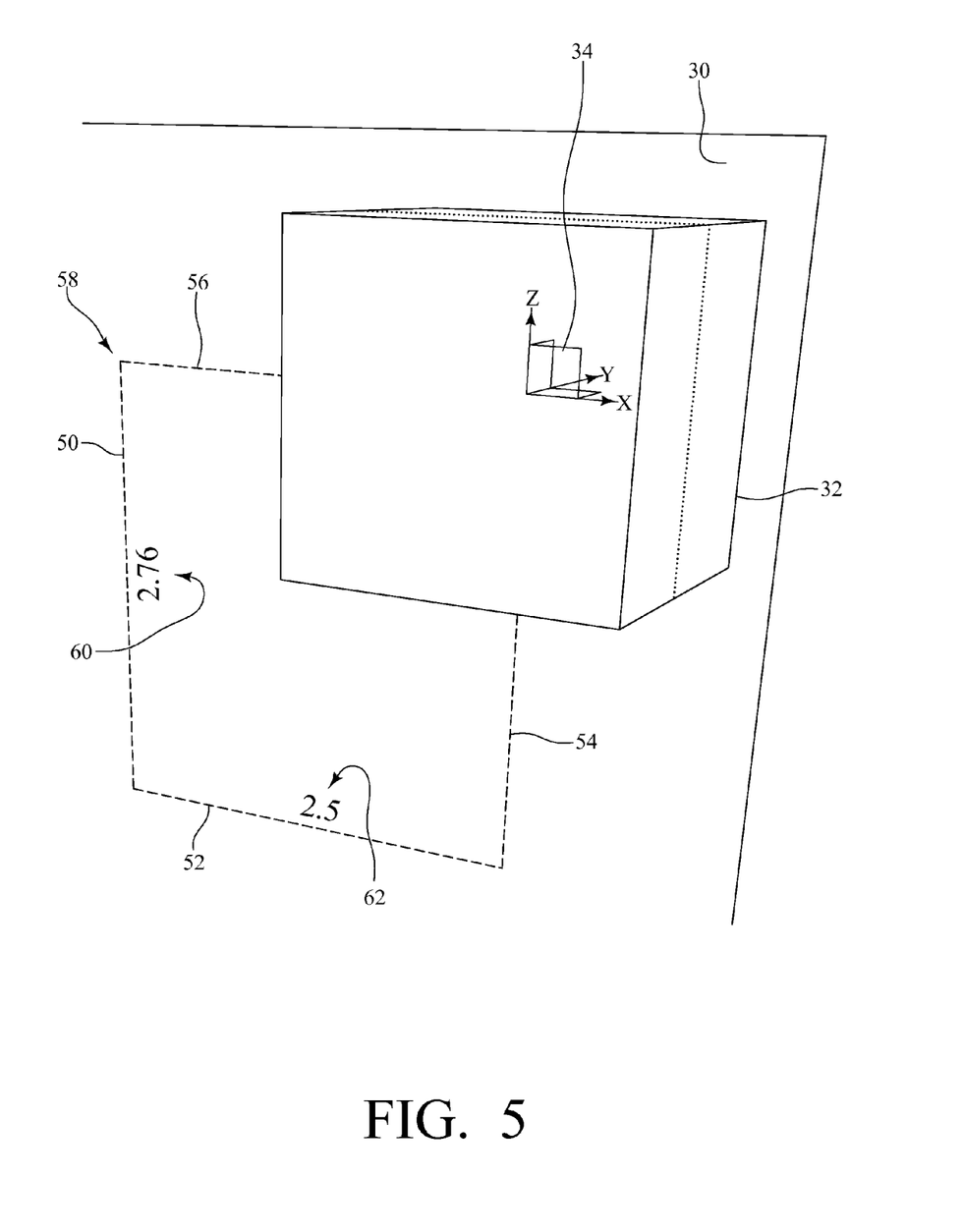
FIG. 5 is an exemplary display showing a guide plane and guide lines displayed during movement of a 3D virtual object across a plane.

FIG. 5 shows the 3D virtual object 32 being transformed or moved across the ZX plane and the guide plane 30 is parallel to the ZX plane. When the 3D virtual object 32 is being transformed or moved across a plane, the guide plane 30 has a normal parallel to the normal of the plane in which the component is being transformed. It is noted that unlike the previous case, where the component is being transformed along an axis, in this case the guide plane 30 is static (i.e., does not dynamically change position) as the component is being moved across the plane.

The size of the guide plane 30 is governed by the size of the 3D virtual scene and ideally stretches across the entire 3D virtual scene. However, it is noted that the size of the guide plane 30 may be user customizable for performance and usability reasons.

The guide plane 30 intersects with various components or objects of the 3D virtual scene which lie along its path. The intersection with the components or objects in the scene gives the user a sense of the relative position of the 3D virtual object 32 under transformation or movement. While the 3D virtual object is being moved along an axis, the guide plane 30 moves along with the component, and by the intersection of the guide plane 30 with the components or objects in the 3D virtual scene, the guide plane 30 enables the placement of the 3D virtual object 32 relative to any other component or object in the scene accurately along the axis.

Once the 3D virtual object 32 has been placed accurately along one of the axes, the user can move the 3D virtual object 32 across a plane perpendicular to the axis to place the 3D virtual object 32 accurately in the three-dimensional space of the 3D virtual scene. It is noted that, in order to properly select an axis and then a plane perpendicular to the axis, the user may only have to reorient the camera once. Therefore, in many cases only a single camera reorientation is sufficient for the user to accurately place the 3D virtual object 32 in the 3D virtual scene.

In certain cases, for example in a complex 3D virtual scene, the user might not be able to place the 3D virtual object 32 with respect to other components or objects in the 3D virtual scene by just moving the 3D virtual object 32 along one axis. This is largely due to a usability issue, where the users do not prefer rotating the camera by more than approximately 45 degrees about a single axis. In this case the user moves the 3D virtual object 32 along a couple of axes for approximate placement of the 3D virtual object 32. Thereafter the user selects a plane and moves the 3D virtual object 32 across the plane for accurate placement. In such a case, the user may have to reorient the camera twice before they can position the 3D virtual object 32 in the desired location.

In addition to the guide plane 30, the user is also shown a set of guide lines during component movement. As shown in FIG. 5, when the user moves the 3D virtual object 32 across the guide plane 30 a set of lines 50, 52, 54, 56 forming a rectangle 58 is displayed to the user. One corner of this rectangle 58 is fixed to the center of the 3D virtual scene and the other end is dynamically attached to the center of the 3D virtual object 32 being transformed. Magnitudes 60, 62 of the relative distances of the 3D virtual object 32 from the center of the 3D virtual scene represented by the lines 50, 52 fixed to the center of the 3D virtual scene provide the user with additional cues when positioning the 3D virtual object 32. The actual distance covered by these lines 50, 52 can also be reported elsewhere or on demand.

Figure 6:
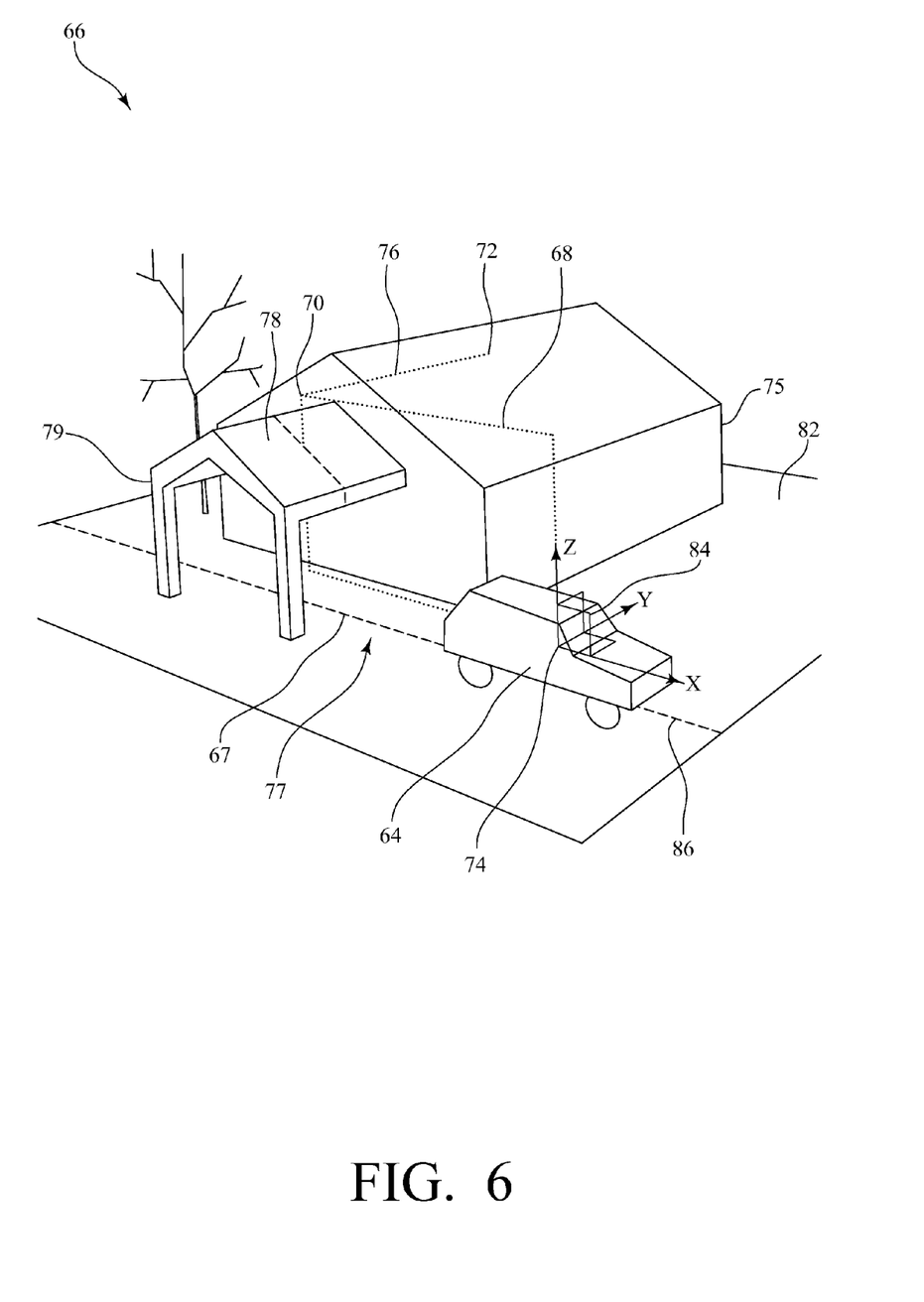
FIG. 6 is an exemplary display showing a 3D virtual object during movement in a 3D virtual scene.

FIG. 6 shows an exemplary display of a car object 64 (i.e., a 3D virtual object), in a 3D virtual scene 66. In this example, the user is moving the car object 64 across the ZX plane. On a guide plane 67 is displayed a guide rectangle 68 with one corner 70 fixed to the center 72 of the scene 66 projected on the guide plane 67, and the opposite corner 74 attached to the center of the car. Another guide line 76 is displayed which connects the actual center 72 of the 3D virtual scene 66 to the projected center (corresponding to corner 70) of the 3D virtual scene 66. The user thus is provided with information regarding the relative position of the car object 64 from the center 72 of the 3D virtual scene 66, which is near a roof object 73 of a house object 75. Moreover, the user can readily discern that the car object 64 can be moved into a shaded portion of a driveway object 77 of the 3D virtual scene 66 because the guide plane 67 and the guide rectangle 68 intersect a roof object 78 of a carport object 79, and divides the roof object 78 into approximately equal halves. Also shown in FIG. 6 are a ground object 82, an object controller 84, and a line of intersection 86 of the guide plane 67 with the driveway object 77/ground object 82.

Preferably, the guide rectangle 68 and the guide line 76 are constructed using line primitives available in all computer-implemented graphics software applications and on 3D computer graphics systems. The guide rectangle 68, as shown in FIG. 6, is represented using a set of four line primitives. The guide line 76 that connects the actual center 72 of the 3D virtual scene 66 to the projected center (corresponding to corner 70) of the 3D virtual scene 66, as shown in FIG. 6, can be represented using a single line primitive. Additionally, in most graphics systems, the complete set of the guide rectangle 68 and the guide line 76 can be represented using a set of only five vertices. In certain graphics system, where the width of line primitives can be defined, the guide rectangle 68 and the guide line 76 may preferably be set to a width larger than 1 pixel. The guide rectangle 68 and the guide line 76 represented by a set of five vertices can be composed and rendered in runtime on most graphics systems without incurring any performance hit.

The vertices comprising the guide rectangle 68 and the guide line 76 are created or updated at runtime to reflect a current position of the 3D virtual object (e.g., the car object 64) being transformed.

Figure 7:
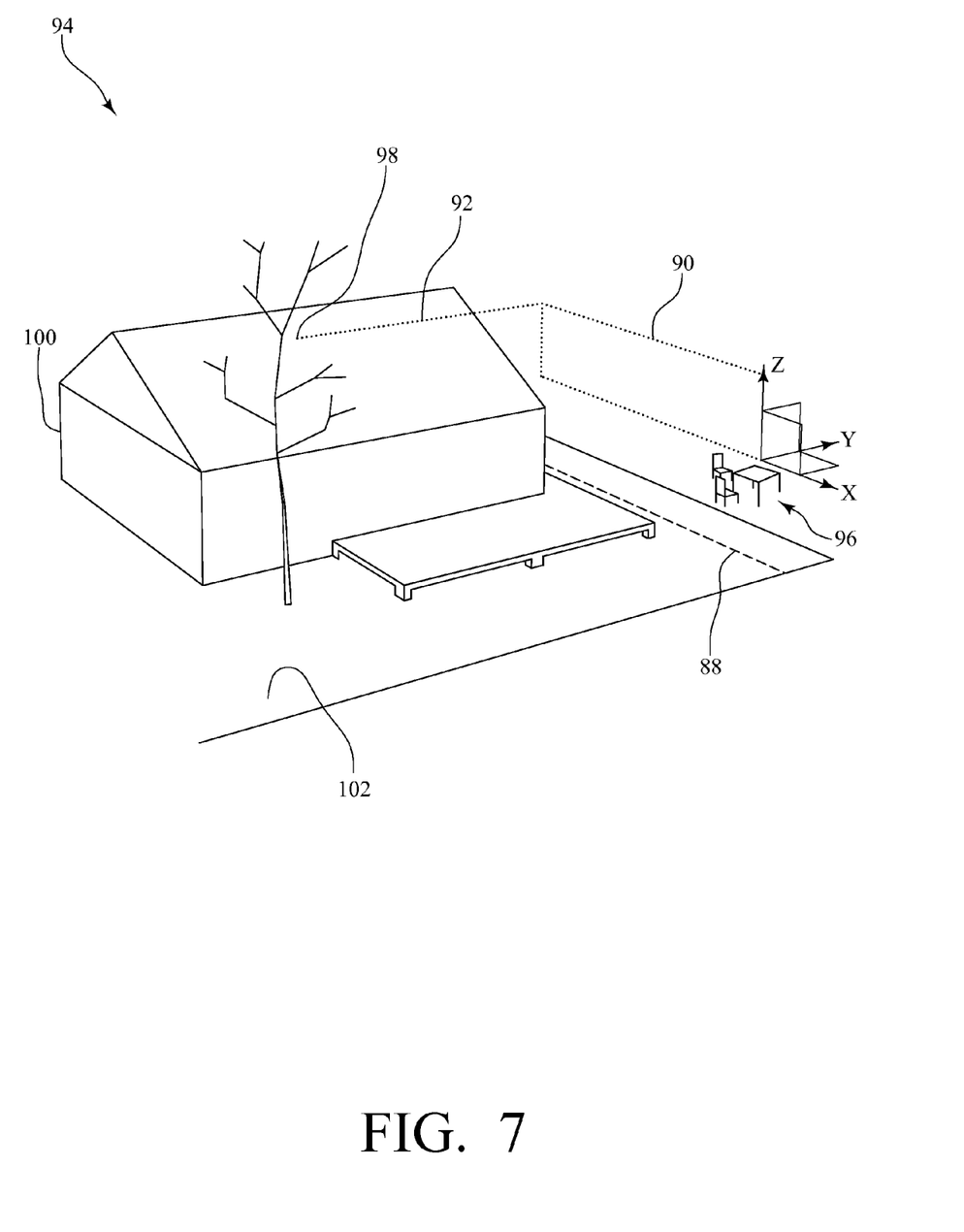
FIG. 7 is an exemplary screen shot illustrates the movement along an axis of an object in a scene.

FIG. 7 shows a guide plane 88, a guide rectangle 90, and a guide line 92 (collectively referred to hereinafter as "guide lines") which do not overly obscure a 3D virtual scene 94. This is quite important when working on complex scenes, because obscuring the 3D virtual scene 94 too much tends to be extremely distracting to the user, and may decrease productivity.

When moving a 3D virtual object, such as the outdoor table and chair set object 96, along an axis the guide lines behave in a similar fashion. In this case, the size of guide rectangle 90 remains fixed, but the guide line 92 from a center 98 of the 3D virtual scene 94 scene to the guide plane 88 changes dynamically as the outdoor table and chair set object 96 is transformed or moved along the Y axis.

To better explain the benefits of having the guide lines, the position of the outdoor table and chair set object 96 in FIG. 6 is taken as a starting point for an example problem. From a current position of the outdoor table and chair set object 96 in FIG. 6, it is desired to move the outdoor table and chair set object 96 not only inside a house object 100, but also place it approximately at a center of the house object 100. With the aid of the guide lines, the movement is accomplished in two steps without having to reorient an active camera. First, outdoor table and chair set object 96 is moved across the ZX plane. On the ZX plane the outdoor table and chair set object 96 is moved lower along the Z axis to bring it to the level of a ground object 102, and the outdoor table and chair set object 96 is moved back along the X axis so that the guide rectangle 90 narrows down to a line. As the second step the outdoor table and chair set object 96 is moved along the Y axis, so that the guide line 92 from the center 98 of the 3D virtual scene 94 to the guide 88 plane almost vanishes, or the guide plane 88 approximately cuts through the center of the house object 100. This brings the outdoor table and chair set object 96 inside the house object 100 and approximately at the center of the house object 100. This example illustrates how easily one can position a 3D virtual object, such as the outdoor table and chair set object 96, in a 3D virtual scene 94, without having to reorient the active camera even once.

Although the invention has been described above in relation to preferred embodiments thereof, it will be understood by those skilled in the art that variations and modifications can be effected in these preferred embodiments without departing from the scope and spirit of the invention.

What is claimed is:

1. A computer-implemented method for large scale spatial positioning of a three-dimensional (3D) virtual object in a 3D virtual scene, computer implemented method comprising:
   in a first computer process implemented on a computer, attaching an object controller to the 3D virtual object, the object controller moving the 3D virtual object in the 3D virtual scene along an axis or across a movement plane in response to a user input; and
   in a second computer process implemented on the computer, displaying a guide plane attached to the 3D virtual object, the guide plane passing through a center of the 3D virtual object and being translucent, the guide plane indicating lines and curves of intersection between the guide plane and other objects of the 3D virtual scene which intersect with the guide plane, such that the guide plane demarcates portions of the 3D virtual object and the 3D virtual scene on either side of the guide plane;
   wherein, when moving the 3D virtual object along the axis, determining a normal of the guide plane to be parallel to the axis and passing through the center of the 3D virtual object, and moving the guide plane with the movement of the 3D virtual object;
   wherein, when moving the 3D object across the movement plane, determining a normal of the guide plane to be parallel to a normal of the movement plane, and holding the guide plane static; and
      attaching a plurality of guide lines to the object controller of the 3D virtual object indicating relative distance of the 3D virtual object from a center of the 3D virtual scene, including:
      displaying a guide line connecting a center of the 3D virtual scene to a center of the 3D virtual scene projected onto the guide plane; and
      displaying a rectangle having one corner fixed to a center of the 3D virtual scene projected onto the guide plane, and a diagonal corner fixed to a center of the 3D object.

2. The computer-implemented method of claim 1, wherein the center of the 3D virtual object through which the guide plane passes is a center of a bounding box of the 3D virtual object.

3. The computer-implemented method of claim 1, wherein the center of the 3D virtual object through which the guide plane passes is the origin of a local coordinate system of the 3D virtual object.

4. The computer-implemented method of claim 1, wherein the center of the 3D virtual scene is a center of a bounding box of the 3D virtual scene.

5. The computer-implemented method of claim 1, wherein the center of the 3D virtual scene is the origin of a local coordinate system of the 3D virtual scene.

6. The computer-implemented method of claim 1, further comprising displaying a magnitude of the distances represented by the guide lines along the guide lines.

7. The computer-implemented method of claim 6, wherein the magnitude of the distances represented by the guide lines is displayed in one of numeric form and textual form.

8. A system for large scale spatial positioning of a three dimensional (3D) virtual object in a 3D virtual scene, comprising:
   a display device displaying the 3D virtual object in the 3D virtual scene;
   an input device receiving input from a user;
   a computing device in communication with the display device and the input device, the computing device:
   attaching an object controller to the 3D virtual object, the object controller moving the 3D virtual object in the 3D virtual scene along an axis or across a movement plane in response to user input from the input device; and
   displaying on the display device a guide plane attached to the 3D virtual object, the guide plane passing through a center of the 3D virtual object and being translucent, the guide plane indicating lines and curves of intersection between the guide plane and other objects of the 3D virtual scene which intersect with the guide plane, such that the guide plane demarcates portions of the 3D virtual object and the 3D virtual scene on either side of the guide plane;
   wherein, when moving the 3D virtual object along the axis, determining a normal of the guide plane to be parallel to the axis and passing through the center of the 3D virtual object, and moving the guide plane with the movement of the 3D virtual object;
   wherein, when moving the 3D object across the movement plane, determining a normal of the guide plane to be parallel to a normal of the movement plane, and holding the guide plane static; and
   attaching a plurality of guide lines to the object controller of the 3D virtual object indicating relative distance of the 3D virtual object from a center of the 3D virtual scene, including:
   displaying a guide line connecting a center of the 3D virtual scene to a center of the 3D virtual scene projected onto the guide plane; and
   displaying a rectangle having one corner fixed to a center of the 3D virtual scene projected onto the guide plane, and a diagonal corner fixed to a center of the 3D object.

9. The system of claim 8, wherein the center of the 3D virtual object through which the guide plane passes is a center of a bounding box of the 3D virtual object.

10. The system of claim 8, wherein the center of the 3D virtual object through which the guide plane passes is the origin of a local coordinate system of the 3D virtual object.

11. The system of claim 8, wherein the center of the 3D virtual scene is a center of a bounding box of the 3D virtual scene.

12. The system of claim 8, wherein the center of the 3D virtual scene is the origin of a local coordinate system of the 3D virtual scene.

13. The system of claim 8, the computing device further displaying the magnitude of the distances represented by the guide lines along the guide lines.

14. The system of claim 13, wherein the magnitude of the distances represented by the guide lines is displayed in one of numeric form and textual.

* * * * *